United States Patent

[11] 3,576,287

[72] Inventors James N. Henshaw;
Clive R. Enock, Birmingham, England
[21] Appl. No. 827,375
[22] Filed May 23, 1969
[45] Patented Apr. 27, 1971
[73] Assignee USM Corporation
Flemington, N.J.
[32] Priority Oct. 8, 1968
[33] Great Britain
[31] 47551/68

[54] FASTENER INSERTING MACHINES WITH WORK STRIPPING SUPPORT
4 Claims, 4 Drawing Figs.

[52] U.S. Cl. ................................................... 227/60
[51] Int. Cl. ................................................... B21j 15/10
[50] Field of Search.......................................... 227/51, 60, 61, 62

[56] References Cited
UNITED STATES PATENTS

| 452,139 | 5/1891 | Hyde, Jr. | 227/60 |
| 1,238,519 | 8/1917 | Hinchcliff | 227/60X |
| 1,355,363 | 10/1920 | Shaw | 227/51X |
| 3,495,754 | 2/1970 | Henshaw | 227/60 |

Primary Examiner—Granville Y. Custer, Jr.
Attorneys—W. Bigelow Hall, Richard A. Wise and Carl E. Johnson ABSTRACT: A machine having a pair of cooperating fastener setting tools, one of which is cyclically movable to receive a fastener in one position and present it to the other tool for setting in a second position, is provided with a pivotal support for a work piece in which the fastener is being inserted. Pneumatic mechanism for operating the tools also controls cyclical heightwise movements of the work support in time relation such that an inserted fastener is stripped with the work from the fastener presenting tool and the latter cleared for return movement to receive another fastener to be inserted.

3,576,287

FASTENER INSERTING MACHINES WITH WORK STRIPPING SUPPORT

CROSS REFERENCE TO RELATED APPLICATION

The present invention pertains to an improvement in, and is herein disclosed as applied to, an eyeletting machine of the type fully disclosed in a pending application Ser. No. 692,042, filed Dec. 20, 1967 in the name of James N. Henshaw now U.S. Pat. No. 3,495,754, issued Feb. 17, 1970.

BACKGROUND OF THE INVENTION

In the machine of the application just referred to a plurality of indexable lower dies are rotated about a horizontal axis by an air motor, each die cooperating at an uppermost locality with a reciprocable upper set die to install and upset a tubular fastener in a workpiece which has been placed between the operating zones of the upper and lower dies. Preferably the machine is pneumatically actuated and adapted to set the very small eyelets commonly used in large quantities in the electronic assembly field. Whether employed for such purpose of for a variety of other ends including ornamentation or ventilation, for instance, it is helpful to expedite proper location of each workpiece in fastener receiving position, and removal or relocation of the work with the installed fastener so that a good rate of machine output is maintained. Whether a workpiece be flexible or stiff, an upset fastener may tend to resist manual removal from one of the cooperating dies. The present invention accordingly enables automatic stripping of each inserted fastener, thereby allowing presentation of the next workpiece or its repositioning and immediate commencement of the next cycle of the machine.

SUMMARY OF THE INVENTION

In view of the foregoing it is a primary object of this invention to provide, especially in a fastener inserting machine of the type having a plurality of rotary set dies for successively carrying fasteners into a setting zone from a fastener receiving locality, work stripping mechanism including a work support movable heightwise of each successive die in the setting zone, whereby a workpiece receiving a fastener may be cleared to be removed or shifted on the support. As herein illustrated a feature of the invention resides in the provision of fluid pressure operated means for actuating the machine instrumentalities, the new support being cyclically actuated in response to the operation of the fluid pressure means.

It is a further object of the invention to provide, in a machine of the type indicated, means for detachably mounting an assembly comprising rotary feed-set dies, a work stripping table, and pneumatic means for operating the dies and table in sequence. Facilitating the substitution of a similar assembly adapted to deal with insertion of a different size of fastener shortens intervals in which the machine might otherwise be inoperative and require added attention for changeover.

BRIEF DESCRIPTION OF THE DRAWINGS

The foregoing and other features of the invention will now be described in greater particularity in connection with an illustrative embodiment thereof and with reference to the accompanying drawings, in which.

DESCRIPTION OF THE PREFERRED EMBODIMENT

In view of the fact that major portions of the illustrated machine, despite changes in appearance, are substantially as fully disclosed in the Henshaw application above cited, only so much of its construction will herein be described in detail as is necessary to an understanding of the present invention, the manner of operation being basically the same.

Figure 1:
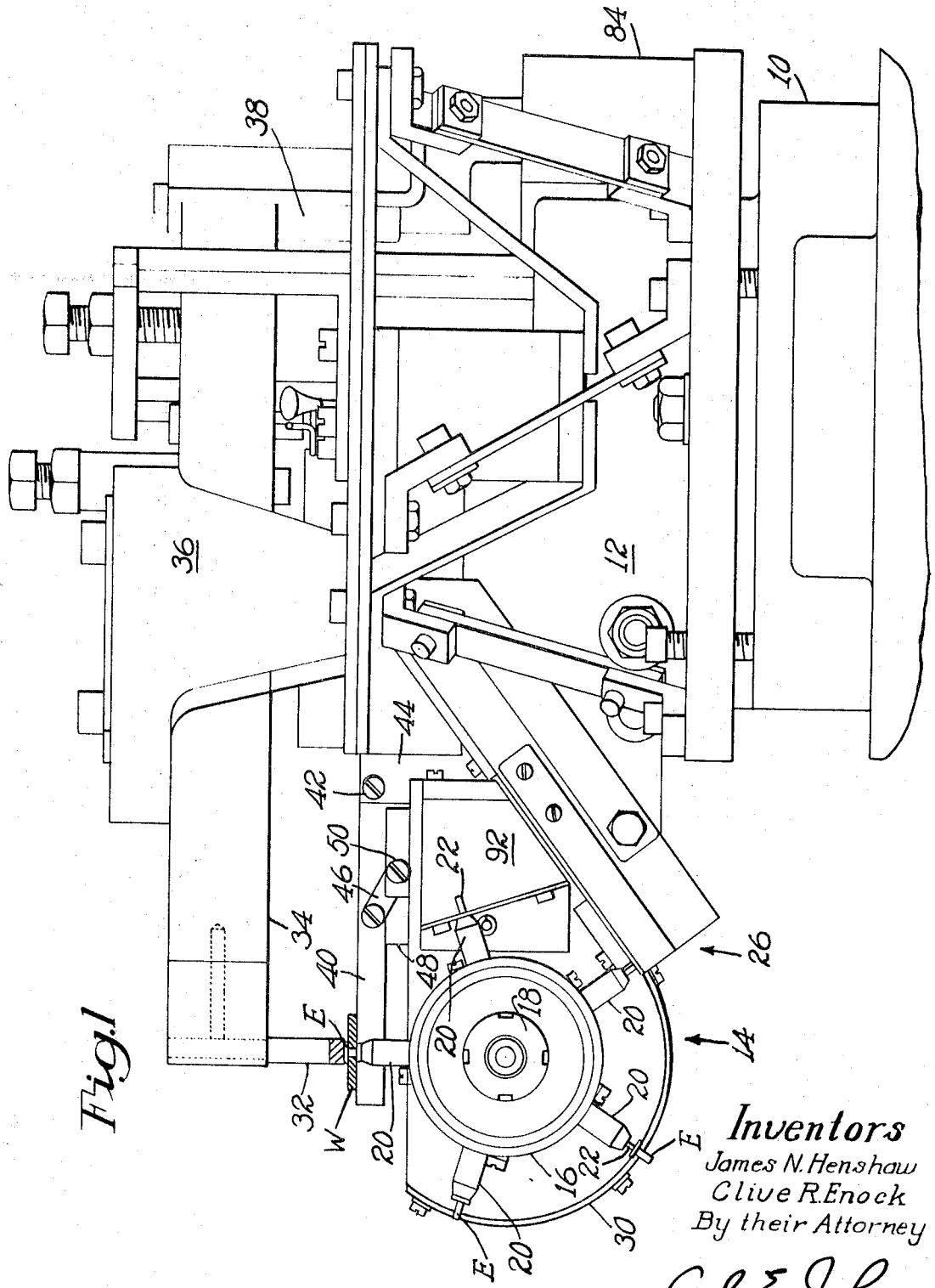
FIG. 1 is a view in side elevation of an eyeletting machine, its upper and lower dies being shown in position for setting an eyelet.
Figure 2:
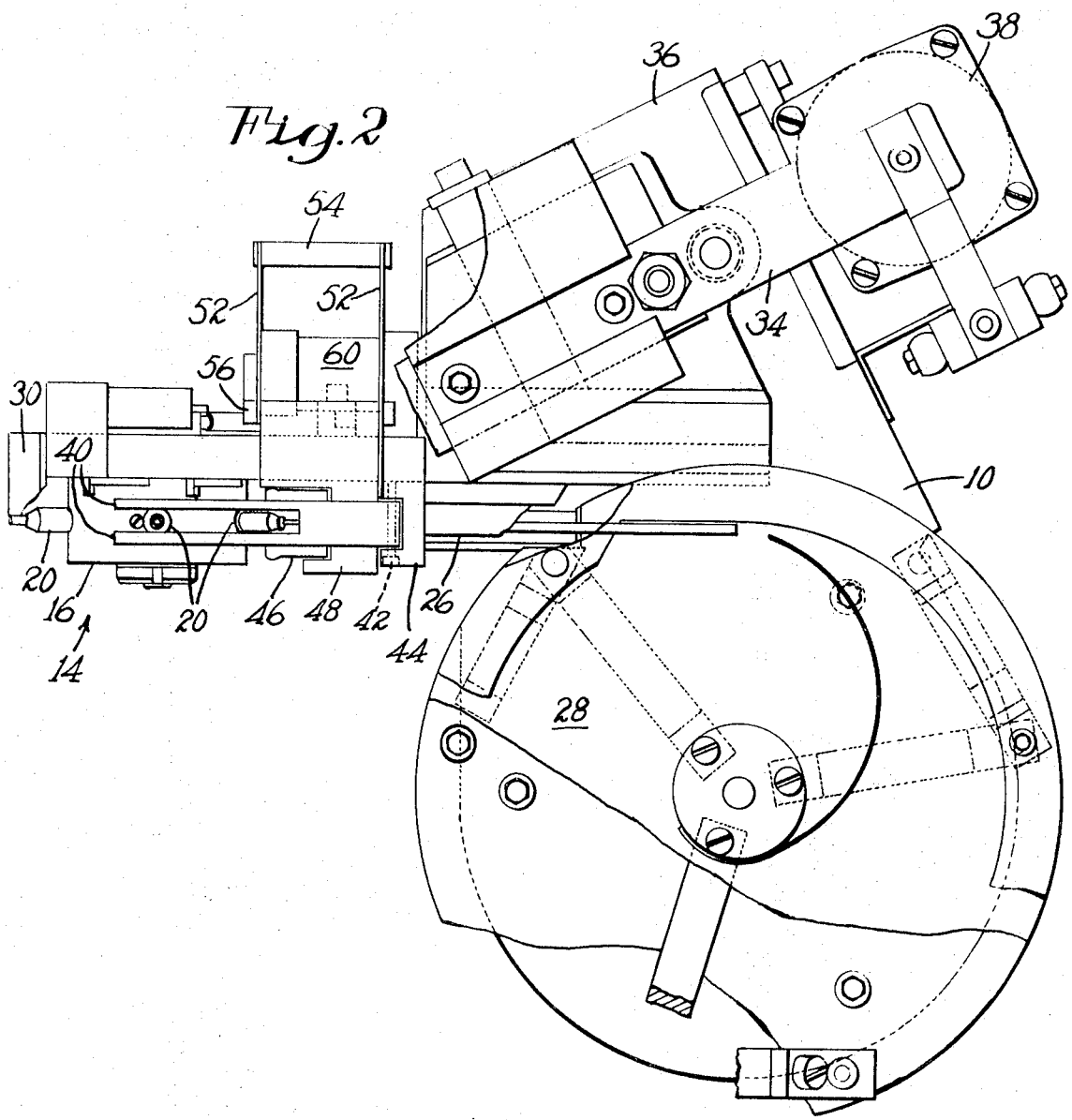
FIG. 2 is a plan view, with portions broken away, of the machine shown in FIG. 1.

A machine base 10 (FIGS. 1 and 2) has secured thereto a bracket 12 which carries a lower die assembly generally designated 14. This lower die assembly comprises a die support 16 rotatable on a horizontal spool 18 and carrying five radial lower dies 20 each of which is fitted with an axial nipple pin 22 for receiving eyelets thereon. By air motor means, not herein shown except for its air supply tube 23 (FIG. 3), upon actuation of a latch 24 (FIG. 3) the lower die assembly is released from a locked condition to rotate one-fifth of a revolution, a die 20 thus being indexed to carry an eyelet E into its uppermost or eyelet setting position.

For supplying the lower dies 20 with eyelets E, their pins 22, which yieldingly project outwardly under air pressure, cooperate with the lower end of a raceway 26 successively to impale endmost eyelets disposed therein with their flange ends up. The raceway is constantly filled with a row of eyelets thus uniformly disposed, preferably by means of a vibratory hopper 28 secured to the base 10. An arcuate guide 30 (FIG. 1) insures that each impaled eyelet E is retained as it is inverted and carried to the setting locality.

For cooperating with each die 20 in its uppermost position to set an eyelet in a workpiece W, an upper die 32 depends from an end of a lever 34 pivoted on the bracket 12 by means of a yoke 36. The lever 34 and hence the upper die 32 is actuated by the piston of a spring-return pneumatic piston-cylinder device 38 (FIGS. 2 and 4) as will hereinafter be described. The workpiece W to be eyeletted is presented on a forked upper end of a work support in the form of a bar 40 (FIGS. 1, 2, and 3) when the upper die is retracted to an upper, inoperative position. For stripping the workpiece from the lower set die 20, the bar 40 is pivoted at its rear end on a pin 42 in a block 44 secured to the bracket 12, cyclical actuation of the work supporting bar being effected heightwise as will next be described.

The bar 40 is pivotally connected by a forked link 46 to an L-shaped slide 48 (FIGS. 2 and 3) by a pin 50 (FIG. 1) and movably supported by and affixed to a pair of parallel leaf springs 52, 52. The latter are mounted on the upper portion of a bracket 54 extending from and secured to the bracket 12. An arm 56 depending from the slide 48 has a forked lower end slidably receiving a piston rod 58 (FIG. 3) of an air cylinder 60 fastened to the bracket 12. Accordingly the arrangement is such that when air under pressure is admitted the the cylinder 60 the slide 48 moves forwardly to cause the link 46 to pivot the bar 40 heightwise about the pin 42 and thereby strip an installed eyelet E from the uppermost nipple pin 22.

Figure 3:
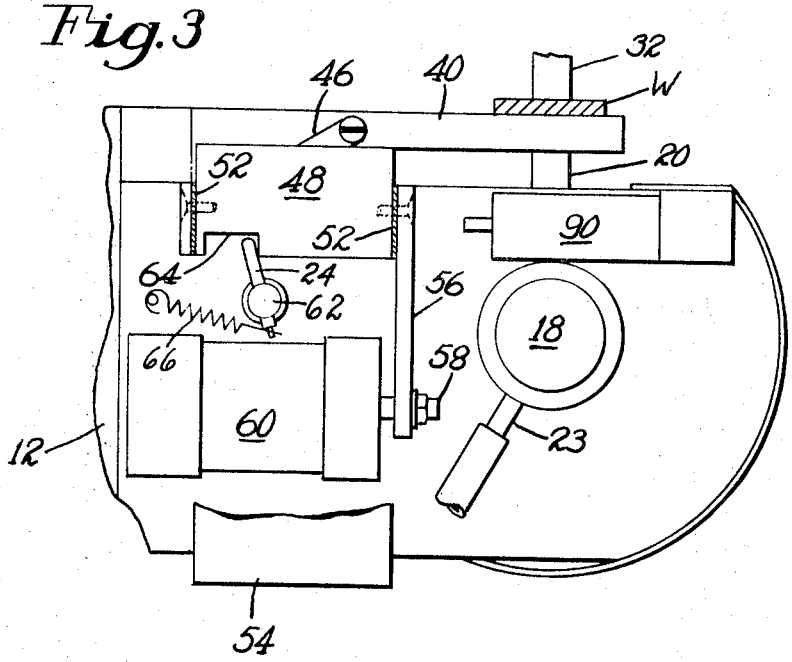
FIG. 3 is a view in side elevation, taken from the side opposite to that seen in FIG. 1, and with a bracket broken away to show the mounting of a work support.

A latch 24 is mounted on a rotatable member 62 which, as explained in the application above cited, controls two stop fingers (not shown) cooperative to release the die support 16 for movement through one-fifth of a revolution. The latch 24 extends into a recess 64 (FIG. 3) in the underside of the slide 48, the recess being elongated to provide lost motion so as not to rotate the latch 24 with the member 62 during forward movement of the slide 48 until the work supporting bar 40 has cleared the workpiece from the pin 42 whereupon the lower die assembly 14 can be reindexed. A tension spring 66 connecting a lower end of the latch 24 to the bracket 12 urges the latch clockwise as shown in FIG. 3.

Figure 4:
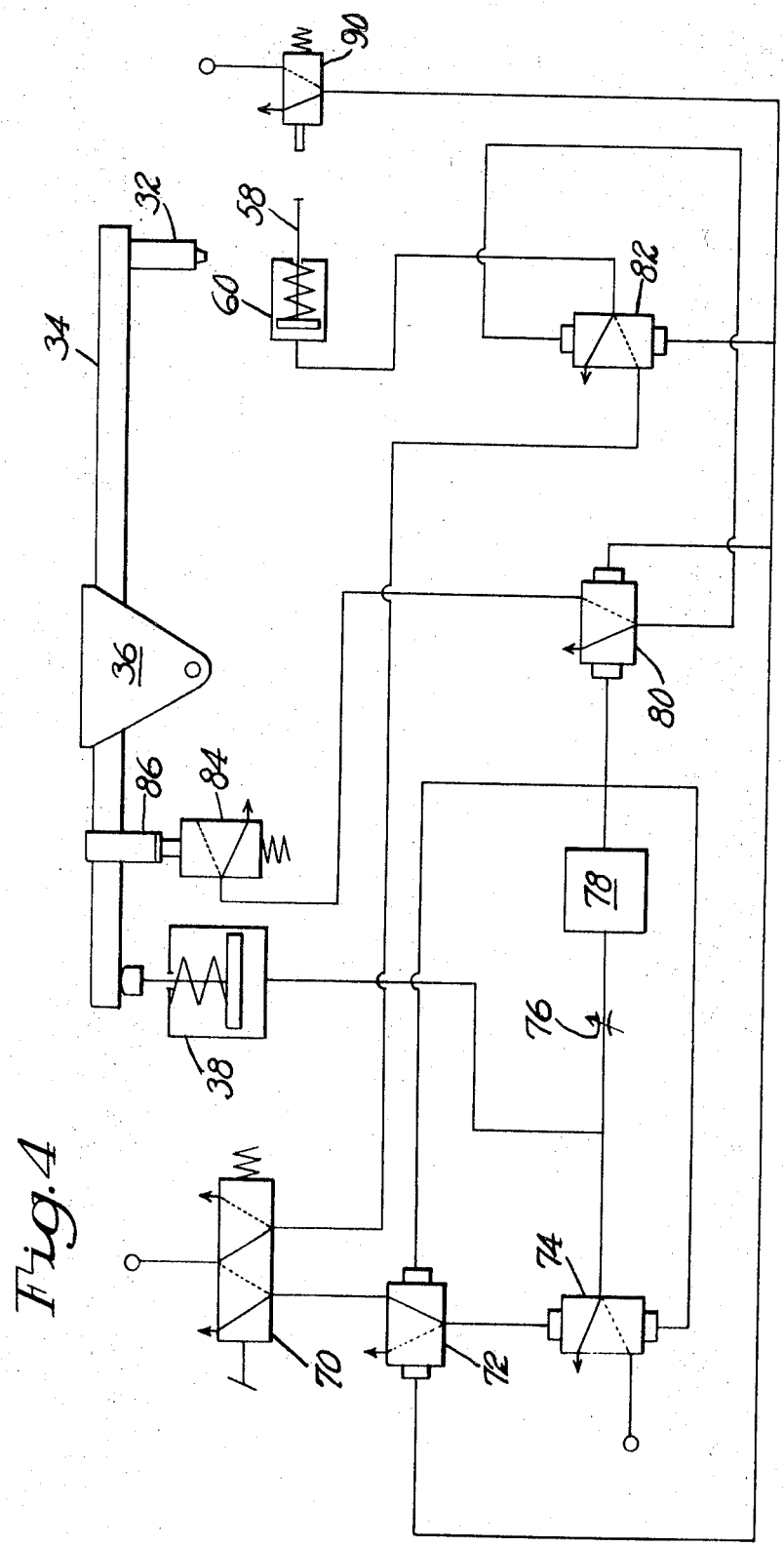
FIG. 4 is a schematic diagram of a pneumatically controlled work support as in FIG. 3.

A cycle of operations will now be briefly reviewed with reference chiefly to FIG. 4. Actuation of a foot-operated or other control valve 70 occurs after an eyelet E has been introduced by an uppermost lower die 20 into a workpiece W resting on the work supporting bar 40. Air under pressure is consequently admitted to a valve 72 to one end of an air operated valve 74 which is thus caused to admit air to the piston-cylinder 38 for driving the upper die 32 downwardly in an eyelet setting stroke. Simultaneously air under pressure from the valve 74 passes through a regulating valve 76 to an accumulator 78 and is available to actuate three valves. Firstly the valve 72 is now shifted to exhaust position. Secondly, the valve 74 is reversely shifted to enable the piston-cylinder 38 to allow upward retraction of the upper die 32. Lastly a valve 80 is actuated to operate an air valve 82. Air to the valve 80 is supplied via a spring-return valve 84 (FIGS. 1, 2 and 4) when it is actuated by a projection 86 carried by a rear portion of the lever 34, the valve 84 accordingly not being actuated until the upper die has been retracted from the work. When the valve 84 is depressed, however, the valve 82 is actuated and, assuming release of the control valve 70, air pressure through the valve 82 acts on the piston of the cylinder 60 to cause its rod 58 to advance the slide 48 and hence raise the work supporting bar 40 as above described. The set eyelet is thus stripped from its nipple pin 22, whereupon the latch 24 is rocked to enable the die support 16 to index and present the next eyelet to be inserted.

Upon reaching the forward limit of its stroke the slide 48 shifts a spring-pressed valve 90 (FIGS. 3, 4) which then causes reversal of the valves 80 and 72. The cylinder 60 now exhausts allowing retraction of the slide 48 and restoration of the valve 90. Consequent reverse rocking of a block 92 (FIG. 1), constituting part of escapement mechanism described in the aforementioned patent allows the die support 16 to complete its one-fifth revolution. The machine is now ready for presentation of a new workpiece locality and the next cycle of operation.

Having thus described out invention, what we claim as new and desire to secure by Letters Patent of the United States is:

We claim:

1. In a fastener inserting machine having a reciprocable set die, and at least one die cooperative therewith in a fastener setting zone, means for cyclically operating said dies and causing one of them successively to present a fastener in said operating zone for upsetting, and work support means mounted for movement in said zone, said work support means being cyclically operable by the die operating means to strip a workpiece on the support means and an upset fastener from between said dies.

2. A machine as set forth in claim 1 wherein the die operating means is fluid pressure actuated.

3. A machine as set forth in claim 2 wherein the fastener presenting die includes a yieldable nipple pin form which the work in said zone is stripped by said work support means, and said work support means is in the form of a pivotally mounted bar having a forked portion for straddling the nipple pin.

4. In an eyeletting machine of the type having a reciprocable upper set die, and a plurality of indexable lower dies rotatable about a horizontal axis to cooperate successively with the upper die in upsetting an eyelet in a workpiece, a work support disposed to straddle the successive uppermost lower dies, said support being mounted for cyclical work-stripping movement following each eyelet upsetting, and means for thus automatically operating the work support in response to upsetting operation of the upper and lower die.